United States Patent [19]

Sato et al.

[11] 3,786,236

[45] Jan. 15, 1974

[54] PROGRAMMED SIGNAL GENERATING APPARATUS

[75] Inventors: Yukihiro Sato; Toshiju Ichinosawa, both of Tokyo, Japan

[73] Assignee: Kabushiki Kaisha Daini Seikosha, Tokyo, Japan

[22] Filed: Dec. 22, 1971

[21] Appl. No.: 210,947

[30] Foreign Application Priority Data

Dec. 24, 1970 Japan .............................. 45/129831

[52] U.S. Cl. 235/61.11 E, 250/219 D, 250/219 DC

[51] Int. Cl. .............................................. G06k 7/10

[58] Field of Search .............................. 235/61.11 E; 250/227, 219 D, 219 DC, 219 DD; 350/96 B; 260/92.8; 101/382, 383

[56] References Cited

UNITED STATES PATENTS

| | | | |
|---|---|---|---|
| 1,937,455 | 11/1933 | Wood | 101/383 |
| 3,353,481 | 11/1967 | Antonucci | 101/382 MV |
| 3,670,646 | 6/1972 | Welch | 101/382 MV |
| 3,673,167 | 6/1972 | Ledoux et al. | 260/92.8 |

OTHER PUBLICATIONS

IBM Technical Discl. Bulletin, Dryjanski, "Optical Reader," Vol. 7, No. 7, 12/1964, p. 614 & 615.

*Primary Examiner*—Thomas J. Sloyan
*Attorney*—Robert E. Burns et al.

[57] ABSTRACT

Programmed signal generating apparatus comprises a plurality of record mediums each containing punched holes arranged according to a predetermined program, a rotary drum having a transparent cylindrical surface having means for releasably connecting one of the record mediums around the drum such that the punched holes overlie the transparent cylindrical surface, and electro-optical reading means for optically reading the punched holes during rotational movement of the record medium and generating corresponding electrical output signals. The electro-optical reading means comprises an array of miniature lamps positioned exteriorly of the drum and in spaced-apart relationship from the drum and a similar array of light-sensitive devices disposed interiorly of the drum each positioned in alignment with one of the miniature lamps to receive light therefrom and operable to generate an electrical output signal in dependence upon the amount of light impinging thereon.

3 Claims, 1 Drawing Figure

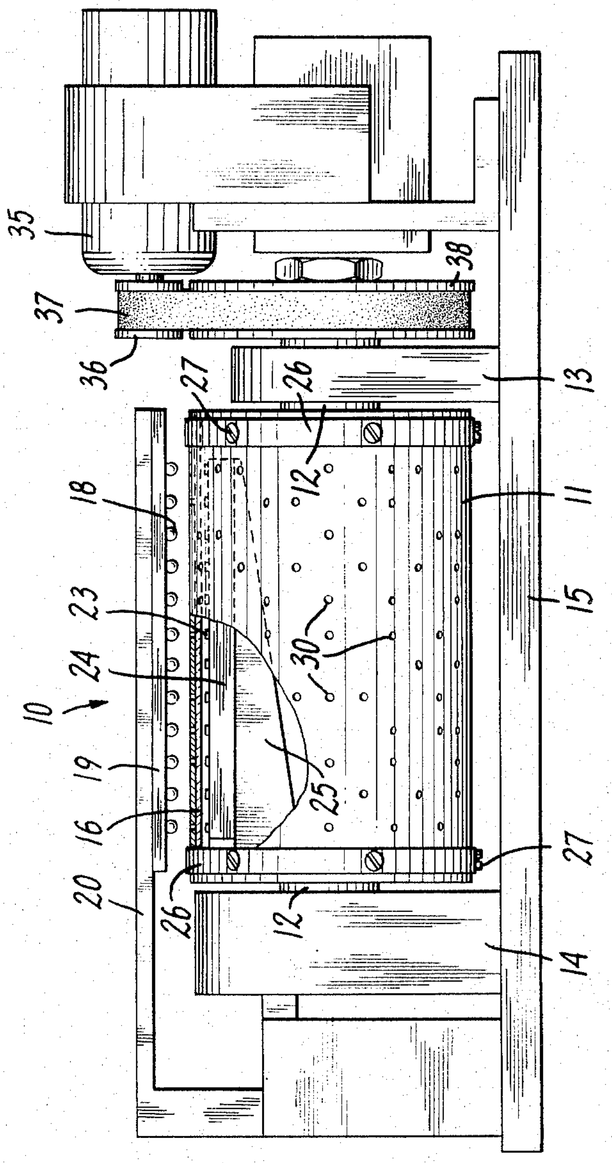

PROGRAMMED SIGNAL GENERATING APPARATUS

The present invention pertains to signal generating apparatus and more particularly, to programmed signal generating apparatus for providing electrical output signals in accordance with a predetermined program to accordingly control the operating sequence of an industrial robot.

Industrial robots are finding widespread use in numerous industrial fields. Most of the industrial robots in current use are programmed to perform various operations by either a pin-board or rotary-drum programming device.

In the pin-board system, a plurality of holes are provided on a control board and a series of pins are inserted into the holes to electrically connect various circuits on the control board in accordance with preselected programs. Thus, the industrial robot is controlled by varying the positional array of the control pins in accordance with predetermined programming patterns.

The rotary-drum system employs a rotary drum having a plurality of cams arranged thereon in longitudinally spaced-apart relationship and a corresponding number of cam-actuated switches each positioned adjacent one of the cams. As the drum rotates, the cams selectively actuate the switches according to a predetermined program and the switches are electrically connected to suitable circuitry for accordingly controlling the operation of the robot.

Both of these prior art systems are disadvantageous in that they provide a low degree of programmability and do not have sufficient memory capacity to meet the needs of present day robots. The pin-board and the rotary-drum systems are also disadvantageous in that they require a relatively large amount of work and time in order to change the program and hence the interchangeability of different programs requires a considerable amount of time and labor. The use of magnetic drums or other memory devices having a very large memory capacity are too expensive and therefore are not economically feasible for current industrial use.

Therefore it is a primary object of the present invention to provide programmed signal generating apparatus for providing a series of electrical control signals to be used for controlling the operations of an industrial robot.

It is a further object of the present invention to provide program signal generating apparatus having means for enabling the interchanging of different programs in a greatly simplified manner as compared to the prior art techniques.

It is another object of the present invention to provide a programmed signal generating apparatus utilizing punched cards as the programmed record medium whereby a rapid and simple change-over of the program may be made by simply interchanging punched cards.

It is a still further object of the present invention to provide a programmed signal generating apparatus which is simple in construction and easy to maintain in operating condition yet which functions in an accurate and efficient manner.

According to the present invention, the programmed signal generating apparatus comprises a series of programmed record mediums each containing programmed information thereon representative of a different program, a rotary drum having means for releasably retaining therearound one record medium and rotating same along a circular path of travel, and electro-optical reading means for optically reading the programmed information and providing corresponding electrical output signals. The electro-optical reading means comprises an array of light sources positioned to direct light onto the rotating record medium and a similar array of light-sensitive devices each positioned to receive the light from one of the light sources in accordance with the programmed information contained on the record medium.

Other features and advantages of the program signal generating apparatus constructed in accordance with the principles of the present invention will be better understood upon a reading of the following specification and appended claims when taken in conjunction with the following drawing in which:

The single FIGURE of drawing is a plan view of an embodiment of the program signal generating apparatus of the present invention.

The signal generating apparatus 10 of the present invention comprises rotatable advancing means for rotationally advancing the record medium along a circular path of travel. The rotatable advancing means includes a rotatable cylindrical drum 11 having an axle 12 connected thereto and mounting means 13, 14 for rotatably mounting the axle 12 on a base member 15. The mounting means comprises a first bearing means 13 for rotatably supporting one end of the axle 12 on the base member and another bearing means 14 for rotatably supporting the other hollow end of the axle 12 on the base member 15.

The rotatable drum 11 has a hollow cylindrical configuration and is provided with a transparent peripheral surface portion 16. The transparent peripheral surface portion 16 is preferaby made of transparent polyvinyl chloride, but transparent glass or other suitable transparent materials may be used for the peripheral surface of the drum.

The electro-optical reading means comprises a longitudinal array of light sources positioned on one side of the transparent drum surface and a similar array of light-sensitive devices disposed on the other side of the transparent drum surface. As shown in the drawing, the light sources are disposed exteriorly of the rotatable drum 11 and comprise a plurality of longitudinally spaced-apart miniature lamps 18. The lamps 18 are longitudinally spaced-apart from one another at equal intervals along the length of the drum and are removably inserted in sockets contained within a support member 19. The support member 19 is rigidly connected to a support arm 20 for supporting the lamps in spaced-apart relationship from the rotatable drum so that the lamps direct their light output normal to the transparent surface of the drum.

The light-sensitive devices comprise a plurality of longitudinally spaced-apart light-sensitive elements 23 each positioned in opposed spaced-apart relationship from one of the light sources 18 to receive the light output therefrom. The light-sensitive elements 23 are each supported by support means 24 in fixed relationship within the interior of the rotary drum in opposed spaced-apart relationship from one of the light sources 18 and the support means 24 extends through the hollow axle 12 and is connected to the bearing means 14. The light-sensitive elements 23 may comprise phototransistors, photovoltaic cells or other well known photosensitive elements which provide an electrical output signal in dependence upon the intensity of the radiant energy received by the element.

The programmed record medium comprises a programmed card 24 dimensioned to fit around the peripheral exterior of the rotatable drum. The programmed card is removably mounted around the peripheral surface of the rotary drum and positioned to a predetermined position where the programmed information contained on the programmed card overlies the light sensitive elements 23 by connecting means 26, 27. The connecting means 26, 27 comprises a pair of circular clamps 26 which releaseably clamp the card in position around the drum and a series of screws 27 threaded into threaded holes in the drum for maintaining the clamps in position. Each programmed card contains alignment holes along the edges through which the screws 27 extend and such an arrangement enables the cards to be properly aligned with respect to the reading means in a simple and rapid manner.

The programmed card is provided with a series of punched holes 30 which are punched in the card in accordance with the desired instructions which are to be carried out by the industrial robot. The holes 30 are arranged along straight lines so that when the card is wound around the rotatable drum, the end portions of each line of holes align with each other. The lines along which the holes are punched are laterally spaced-apart from each other a distance equal to the interval existing between adjacent light sources and adjacent light-sensitive elements whereupon each line of holes has a path of travel between one of the sets of opposed light-sensitive elements and light sources.

Drive means is provided for rotationally driving the rotatable drum and as seen in the drawing, the drive means comprises a rotary drive motor 35 mounted on the base member 15 of the apparatus and the output shaft of the rotary motor is connected to rotationally drive a pulley 36. Another pulley 38 is rigidly connected to the axle 12 of the rotatable drum and a pulley belt 37 is wound around both pulleys and transmits the rotary motion of the driving pulley 36 to the driven pulley 38 to effect rotation of the drum 11.

To operate the signal generating apparatus and accordingly control the movements of an industrial robot (not shown), a programmed card 25 is wound around the drum 11 of the rotatable advancing means so that each line of holes registers with one set of light sources and light-sensitive devices. This is easily accomplished by positioning the alignment holes in the card over the corresponding threaded holes in the drum and then clamping the card in position around the drum by screwing the screws 27 into the threaded holes provided in the drum.

The drive motor 35 is then energized to effect rotation of the driving pulley 36 which in turn rotationally drives the driven pulley 38 by the pulley belt 37. Rotational movement of the driven pulley 38 effects rotation of the axle 12 and rotation of the rotatable drum 11. The pulley diameters are suitably chosen to effect rotation of the drum 11 at a speed of approximately 1,000rpm and obviously other speeds may be used depending upon the frequency and number of signals which are to be derived.

As the drum rotates, the various punched holes in the programmed card rotate into the path of light emitted from the light sources 18 thereby enabling the light to impinge upon corresponding ones of the light-sensitive devices 23. The light-sensitive devices 23 accordingly generate electrical signals comprising a series of pulses each corresponding to one of the punched holes. As well known in the art, the electrical signals developed by each of the light-sensitive devices are applied to the robot to accordingly control the operations of the robot in accordance with the information contained on the programmed record medium.

The programmed signal generating apparatus of the present invention serves as an input device for the robot and generates control signals in accordance with a predetermined program to accordingly control the sequence of operations performed by the robot. The particular sequence of operations performed by the robot may be altered by merely replacing the programmed record medium with another programmed record medium containing the desired program. Thus the apparatus of the present invention provides a high degree of programmability in a rapid and easy manner and at a low cost.

Many modifications of the embodiment described above will become apparent to those skilled in the art and the present invention is not in any way limited to the disclosed embodiment but includes all modifications falling within the scope and spirit of the appended claims.

We claim:

1. Programmed signal generating apparatus comprising: at least one programmed record medium containing programmed information composed of an array of light-transparent portions representative of a predetermined program; rotatable advancing means for rotationally advancing said record medium along a circular path of travel, said means comprising a rotatably mounted hollow drum having a transparent cylindrical surface portion; positioning means for positioning one record medium in a predetermined position on said drum to enable reading of the programmed information contained on said record medium, said positioning means comprising means defining a plurality of holes in said drum circumferentially spaced around the periphery of each end portion of said drum, and means defining a plurality of holes in said record medium corresponding to said holes in said drum and overlying said holes in said drum when said record medium is in said predetermined position on said drum thereby enabling positioning of said record medium in said predetermined position on said drum; connecting means coacting with said positioning means and operative only when said record medium is in said predetermined position for releasably connecting said record medium around an external surface of said drum, said connecting means comprising a pair of annular members disposable around both an exterior portion of said drum and around said record medium and each having means defining holes therethrough overlying the holes in one end portion of said drum and said record medium when connecting said record medium to said drum, and a plurality of threaded members each insertable through one of said holes in said annular member and said record medium and each threadable into said threaded holes thereby connecting said record medium to said drum when same is in said predetermined position; and reading means disposed along said circular path of travel for optically reading the programmed information during rotational advancement of said record medium and generating corresponding electrical output signals, said means comprising a plurality of light sources fixedly mounted on the external side of said drum in longitudinally spaced-apart relationship therealong, and a plurality of light-sensitive devices fixedly mounted on the internal side of said drum normal to said transparent cylindrical surface portion each positioned in spaced-apart relationship from one of said plurality of light sources to receive light therefrom and operable to generate an electrical output signal in dependence upon the amount of light impinging thereon; whereby light passing from said light sources through both the transparent drum and light-transparent portions of the record medium impinges on the light-sensitive devices causing them to generate electrical output signals inaccordance with said predetermined program.

2. Apparatus according to claim 1; wherein said transparent cylindrical surface portion of said drum is composed of transparent polyvinyl chloride.

3. Apparatus according to claim 1; wherein said at least one record medium comprises a plurality of punched cards each having means therein defining an array of punched holes representative of a different predetermined program.

* * * * *